United States Patent [19]

Sroka et al.

[11] Patent Number: 5,012,413
[45] Date of Patent: Apr. 30, 1991

[54] RAILROAD TRACK CURVE LINING APPARATUS AND METHOD

[75] Inventors: Dennis A. Sroka; William E. Perry, both of Ludington, Mich.

[73] Assignee: Pandrol Jackson, Inc., Ludington, Mich.

[21] Appl. No.: 225,040

[22] Filed: Jul. 27, 1988

[51] Int. Cl.$^5$ .................. G06F 15/20; E01B 35/10
[52] U.S. Cl. ................ 364/424.01; 364/571.02; 33/287; 33/1 Q; 104/7.2; 104/2; 246/122 R; 246/107
[58] Field of Search .............. 364/424.01, 571.01, 364/571.02; 33/1 Q, 287; 73/146; 246/107, 122 R; 104/7.2, 2; 105/4.1

[56] References Cited

U.S. PATENT DOCUMENTS

| | | | |
|---|---|---|---|
| 3,547,038 | 12/1970 | Strasser | 104/8 |
| 4,173,073 | 11/1979 | Fukazawa et al. | 33/1 Q |
| 4,367,681 | 1/1983 | Stewart et al. | 104/72 |
| 4,393,691 | 7/1983 | Koehne | 73/84 |
| 4,428,296 | 1/1984 | Scheuchzer et al. | 104/2 |
| 4,574,704 | 3/1986 | Cicin-Sain | 104/8 |
| 4,724,653 | 2/1988 | Buhler | 104/7.2 |
| 4,880,190 | 11/1989 | Austell et al. | 246/107 |

FOREIGN PATENT DOCUMENTS 1199114 1/1986 Canada .

OTHER PUBLICATIONS von Beckman, "How Automated Track-Lining and Raising Systems Work . . . The Tamper System", *Railway Track and Structures*, p. 24, (Jan. 1977).
Bradshaw, "How Automated Track-Lining and Raising Systems Work . . . The Jackson System", *Railway Track and Structures*, p. 25 (Jul. 1976).

*Primary Examiner*—Parshotam S. Lall
*Assistant Examiner*—V. N. Trans
*Attorney, Agent, or Firm*—Warner, Norcross & Judd

[57] ABSTRACT

The specification discloses an improved railroad track curve liner for more accurately locating track transition points to more accurately calculate an improved track configuration as a funcion of the existing track configuration. The curve liner is mounted on a track tamper. During a first pass over the track, the curve liner acquires track ordinate information. After calculating the ideal track configuration, the tamper laterally shifts the track to the ideal configuration in a second pass over the track. The improved track configuration is calculated in recognition that the ordinate graph is not linear in all areas—particularly at tract transition points.

20 Claims, 10 Drawing Sheets

RAILROAD TRACK CURVE LINING APPARATUS AND METHOD

BACKGROUND OF THE INVENTION

The present invention relates to railroad track-lining devices and methods, and more particularly to such devices and methods using computer modeling to fit an "ideal" curve to existing track position data.

Railroad tracks are laid out according to a mathematical model. All track is comprised of three types interconnected to define a desired path. These types are referred to as tangent, spiral, and curve. Tangent segments are straight or linear; curved segments have a fixed radius; and spiral segments interconnect tangent and curve sections. The point at which spiral segments meet tangent or curve sections are referred to as track transition points. Knowing the location of the transition points and the radius of the curve sections, the spiral sections can be mathematically calculated according to well-known formulas.

The tracks are supported by a flexible bed of ballast and therefore shift from the mathematical model over time. The tracks must therefore be "lined" using a linear or similar apparatus. Track ordinate information is acquired to determine the existing position of the track. The ordinate information is graphed; and an attempt is made to reconstruct the mathematical model for the track based upon the graphed information. After the model is determined, the liner is operated over the track to laterally shift the track as necessary back to the mathematical model.

Automatic track-lining systems have been developed to line railroad track and return the track to an "ideal" configuration. One such system has been manufactured and sold by Jackson Jordan, Inc. of Ludington, Mich., the assignee of the present application as its Model No. ACCL. This liner is disclosed in Canadian Patent No. 1,199,114 issued Jan. 7, 1986 to Bradshaw et al, entitled TRACK CURVE LINING METHOD AND APPARATUS, and assigned to Jackson Jordan, Inc.—the assignee of the present application. The apparatus described therein makes two passes over a length of track to be relined. On the first pass, a light/mask/sensor system collects ordinate information at discrete positions. An on-board computer then calculates a better-fit curve based on the actual data. On the second pass, the liner lines the track in response to the calculated curve information.

The Model ACCL curve liner calculated the model track configuration by manipulating the track data using a digital computer. First, the data was scanned for sequences of relatively constant ordinate values indicating tangent and curve segments of the track. Second, the computer found a "best-fit" line in each spiral area (i.e. those areas between segments of constant ordinate value). Third, the intersections between sloped spiral lines and constant tangent and curve lines were determined and assumed to be the track transition points. Based upon the constant ordinate values and the locations of the transition points, the computer then calculated desired track locations to fit the "ideal" mathematical configuration according to well-known formulas.

Although constituting a significant advance in the track-lining art, Jackson Jordan has continually strived to improve the performance of its equipment. It was noted by Jackson Jordan that the curves determined by prior lining systems were indeed somewhat worse in certain regards than the original curves. Consequently, in certain situations the track was being moved away from the ideal mathematical curve; and system operators had to compensate for the erroneous computer calculation to empirically produce an ideal curve which appeared "right". Consequently, the computer calculation of the curve required significant human interaction and therefore possible operator error.

SUMMARY OF THE INVENTION

The aforementioned problems are overcome by the present invention permitted. After extensive analysis of track ordinate data, the Applicants finally discovered that the ordinate data cannot be connected solely by straight line segments. Specifically, it was discovered that the ordinate data is nonlinear whenever any one of the light, mask, or sensor is on a type of track (i.e. tangent, spiral, or curve) different from the segment type on which the other two elements reside. Prior to computer liners, ordinate information was taken only every 40 feet; and the acquired ordinate information was simply too crude to provide this fine analysis. With the advent of computer liners and the acquisition of ordinate data at relatively closely spaced locations, the nonlinear areas became apparent.

The present invention is directed to a system for improving the calculation of a mathematical track configuration as a function of actual ordinate information by compensating for nonlinearities near track transition points in the ordinate graph. In a first aspect, the system includes an improved means for calculating the straight line approximation of the spiral ordinate data. Specifically, a linear regression is run for a variety of segments of the spiral ordinate data. The varying segments are created by repetitively removing one ordinate point from each of the two ends of the spiral and recalculating the linear regression. This is performed a sufficient number of times to insure that the areas of nonlinearity are removed. A correlation coefficient is then calculated for each linear regression to find the "best-fit" straight line through the linear portion of the spiral ordinate information. The graph intercepts between the "best-fit" sloped lines and the constant tangent and curve lines are then determined.

In a second aspect, Applicants take advantage of their unique realization that the graph intercepts are not the track transition points. Although one transition point is associated with each graph intercept, the transition point is coincident with the graph intercept only when the ordinate information has been acquired using a mid-ordinate measurement. However, no reference system available today provides a mid-ordinate measurement; and consequently, all transition points are offset from the graph intercept. Such offset is a function of the position along the cord at which the ordinate is measured. Mathematically, the graph offset is approximated as the distance of $(A-B)/3$ wherein A and B are the lengths of the chord segments on either side of the ordinate measurement point.

By using both aspects of the present invention, the transition points are located with greater precision than has previously been possible in any lining system, either by hand or by computer. A mathematically "ideal" track configuration can then be determined using well-known mathematical formulas. Tracks can be totally computer lined without human intervention and with unparalleled accuracy.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
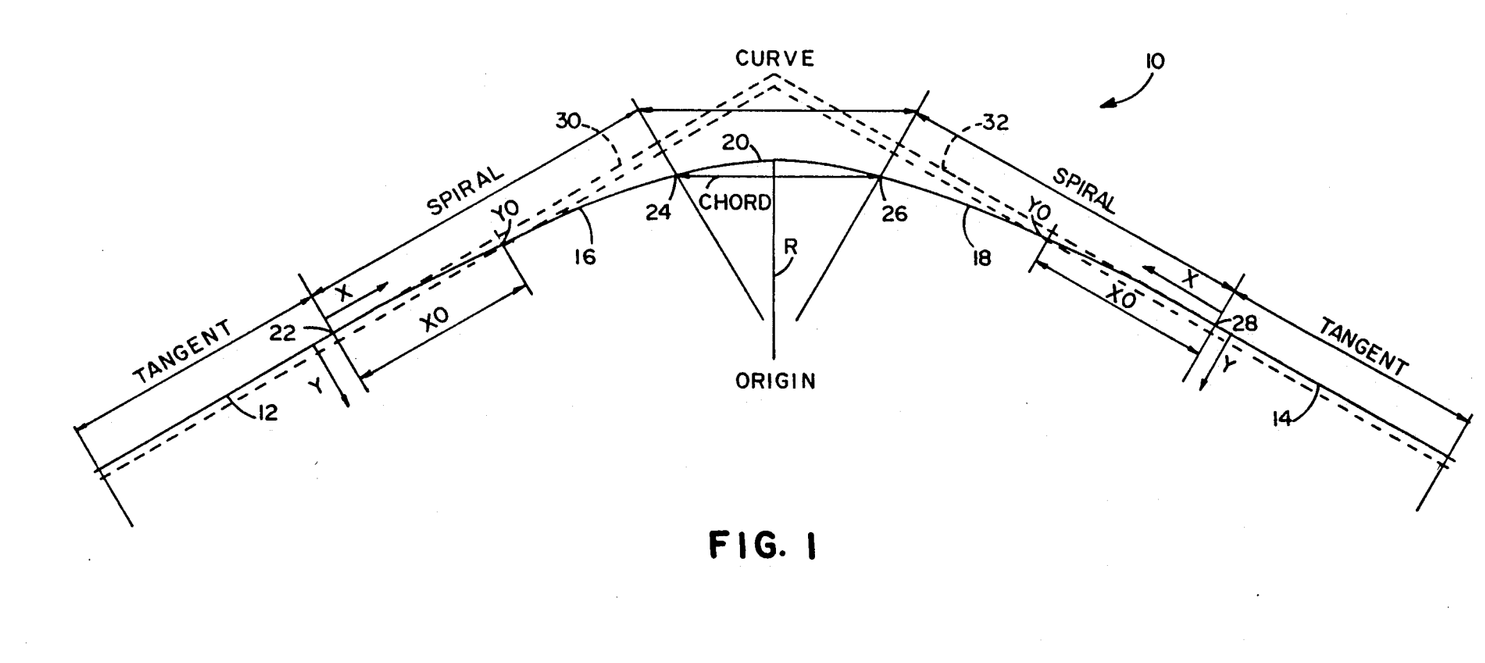
FIG. 1 is a schematic diagram setting forth the mathematics of a railroad track curve.

The mathematical model of a railroad track is illustrated in FIG. 1 and generally designated 10. The track illustrates a complete tangent-to-spiral-to-curve-to-spiral-to-tangent arrangement, including tangent segments 12 and 14, spiral segments 16 and 18, and a curve section 20. The tangent sections 12 and 14 are straight or linear; and the curve section 20 has a fixed radius R. The spiral segments 16 and 18 interconnect the curve section 20 to the tangent sections 12 and 14, respectively. Each point at which the track changes type is referred to as a transition point. Specifically, point 22 is a tangent-to-spiral (TS) transition point; point 24 is a spiral-to-curve (SC) transition point; point 26 is curve-to-spiral (CS) transition point; and point 28 is a spiral-to-tangent (ST) transition point. The dotted lines 30 and 32 are linear extensions of the tangent sections 12 and 14, respectively. The Y offset or perpendicular distance from the imaginary lines 30 and 32 for each spiral is calculated according to the following well-known formula:

$$\frac{D}{L_s} \cdot \frac{\pi}{180} \cdot \frac{X^3}{600}$$

Wherein
D = the degree of the curve
$L_s$ = the length of the spiral
X = the distance from the transition point TS
Consequently, it will be appreciated that each area of the track is and should be mathematically calculated to conform to an "ideal" theoretical model.

Ordinate information for the track is the most common means of determining the degree of curve at each point along the track. When such information was collected by hand, a string was used as a track chord; and the ordinate from the track to the midpoint of the chord was measured as the "mid-ordinate" measurement. The length of the string was selected so that the mid-ordinate measurement in feet was identical to the curve degree. As is well known, the ordinate on tangent sections of track is of course zero and the ordinate on the curve section of the track will be constant for any given curve. The ordinate information however in spiral track sections will vary throughout spiral as the spiral assumes a greater and greater degree from the tangent section to the curve section.

Over time, usage of the track will inevitably push it from its mathematical ideal. The tracks are supported within a flexible bed of ballast, and trains which travel over the tracks are extremely heavy and therefore exert large forces on the track. Consequently, the track must be "relined" or returned to its mathematic model periodically to prevent excessive rail wear and possible catastrophic events. A track is typically relined by measuring ordinate information along the length of the track and then reconstructing the mathematical model as the "best-fit" of the existing ordinate information. Originally, the ordinate information was graphed by hand; and the mathematical model fit by hand by a worker. More recently, the measurement information is acquired using light and mask techniques; and the acquired ordinate information is computer analyzed in an attempt to find the best-fit configuration.

Figure 3:
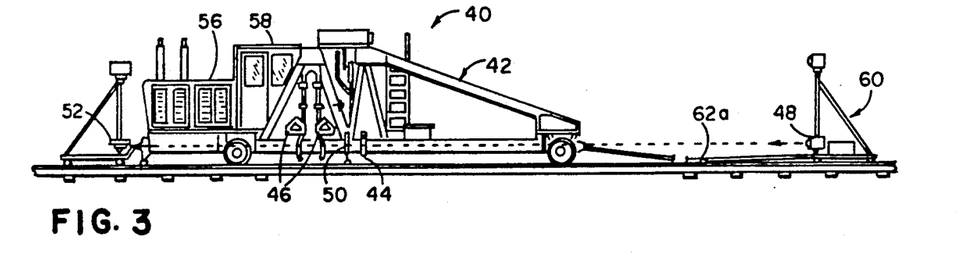
FIG. 3 is an elevational view of the physical apparatus for measuring the track ordinate information and subsequently working the track.
Figure 4:
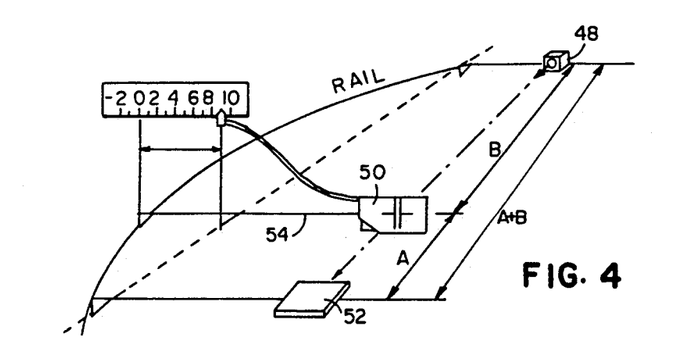
FIG. 4 is a schematic illustration of the ordinate measurement information.

One such apparatus for acquiring and subsequently working the track is illustrated in FIGS. 3 and 4 and generally designated 40. With the exception of the curve liner computer and software mounted on board, the apparatus 40 is generally well known to those having ordinary skill in the art and will not be describe in detail. For example, one such suitable apparatus previously manufactured and sold by Jackson Jordan, Inc. of Ludington, Mich. is illustrated in Canadian Patent No. 1,199,114 issued Jan. 7, 1986 to Bradshaw et al and entitled TRACK CURVE LINING METHOD AND APPARATUS. The disclosure of this Canadian patent is hereby incorporated by reference.

To briefly summarize, the apparatus includes a self-propelled machine 42 carrying a track-lining assembly 44, a hydraulic lining cylinder (not visible) for laterally shifting the lining assembly, and tamping devices 46 for tamping the track ballast (i.e. gravel) to secure the track in its new position. The apparatus 40 includes a light source 48, a mask 50, and a sensor 52 for establishing a reference line for acquiring ordinate information. The sensor 52 is mounted on the apparatus 40 and is held at a fixed lateral distance from a rail of the track. The mask 50 is shiftably mounted on the apparatus 40 through a support 54 to be laterally shiftable on the support by a linear actuator. The apparatus 40 includes a power plant 56 and an operator's cab 58 which contains, in addition to the usual controls, a data processor, a printer, and control circuitry (not specifically shown). A light source 48 is a sealed beam incandescent lamp mounted on a carriage 60 traveling on the track. The carriage 60 is pushed ahead of the apparatus 40 by a plurality of buggies e.g. 62a which ride on the track and extend between the machine 40 and the carriage 60.

As described in the Canadian patent, the mask 50 can be shifted to provide an ordinate measurement for the present position of the apparatus 40. As best seen in FIG. 4, the mask-to-light distance B is significantly longer than the mask-to-sensor distance A. Consequently, the ordinate information acquired by the apparatus 40 is not "mid-ordinate" data.

Figure 5:
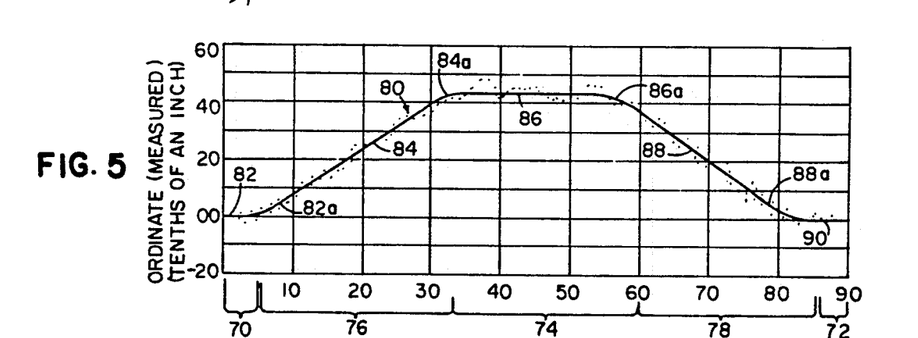
FIG. 5 is an ordinate graph of actual track ordinate information with a best-fit curve calculated therefor.

An ordinate graph for section of a railroad track curve is illustrated in FIG. 5. The disconnected dots are the actual ordinate information acquired by the apparatus 40 on its first pass over the track. The beginning area 70 and ending area 72 of relatively constant zero ordinates correspond to tangent track. The middle area 74 of constant non-zero ordinate values correspond to a constant curve section. The areas 76 and 78 including continually increasing or decreasing ordinate measurements indicate spiral track. The line 80 represents the best-fit mathematically ideal curve fitted by the present invention through existing ordinate information. As will be explained below, the various linear segments 82, 84, 86, 88, and 90 do not meet at sharply angular intersections as described in the Canadian patent and as believed in the art prior to the present invention. Instead, the straight line segments meet in gently rounded curves 82a, 84a, 86a, and 88a in those areas where the light, mask, and sensor are not all on one type of track.

Figure 6:
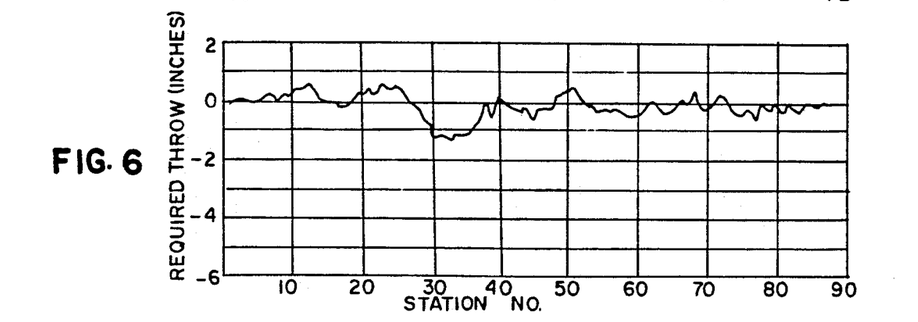
FIG. 6 is a graph of the throws required to return the track to the mathematical model.

The required throw information in view of the FIG. 5 graph is illustrated in FIG. 6. The required throw represents the deviation of the track from the mathematically perfect curve. This represents the distance that the track must be "thrown" or laterally shifted at each location along its length to be placed on the mathematical curve. This information is used by the apparatus 40 in its second pass over the track in a method analogous to that described in the Canadian patent to reline the track and thereby place it more closely in conformance with the mathematical model.

Figure 2:
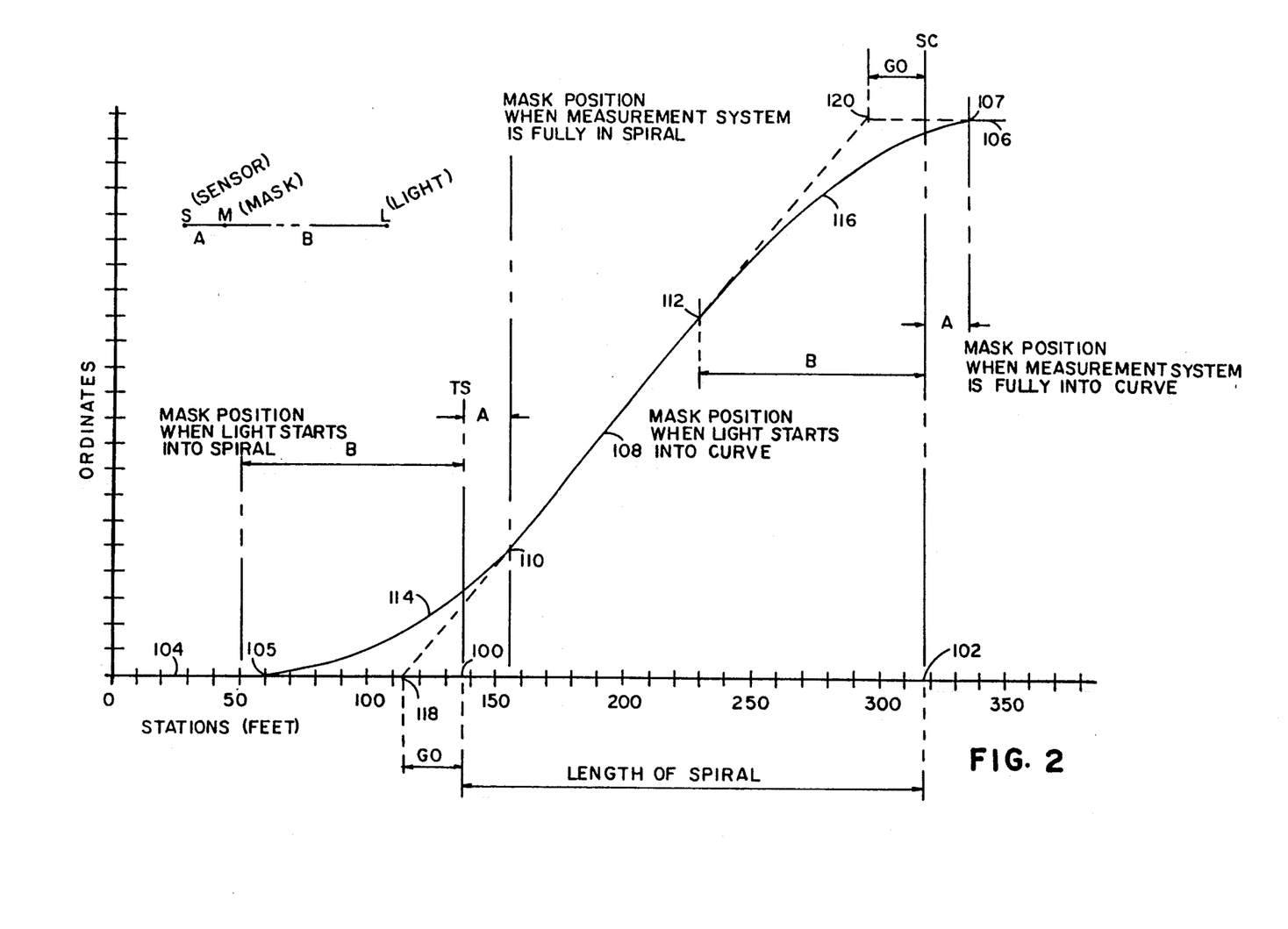
FIG. 2 is a track ordinate graph of a tangent-to-curve transition.

FIG. 2 illustrates the best-fit curve generated pursuant to the present invention. The tangent-to-spiral (TS) transition point is located at 100, and the spiral-to-curve (SC) transition point is located at 102. The line segment 104 represents the tangent ordinate of zero, and the line segment 106 represents the constant non-zero ordinate of the curve. The linear line segment 108 between points 110 and 112 represents the best-fit linear regression of the spiral data between these two points. The curved segment 114 between points 105 and 110 and the curved segment 116 between points 112 and 107 correspond to areas wherein the sensor, mask, and light are not all on one type of track (i.e. tangent, spiral, or curve). Prior to the present invention, it was commonly believed that the TS transition point was located at 118 which comprises the graph intersection of the extended line 108 and the line segment 104. Similarly, it was commonly believed that the SC transition point was located at point 120 which is the graph intersection of the line segment 108 and the line segment 106. As will be explained below and as illustrated in FIG. 2, the transition points are not located at the graph intersections; and such erroneous assumption was in part responsible for the prior imprecise mathematical models.

Figure 7:
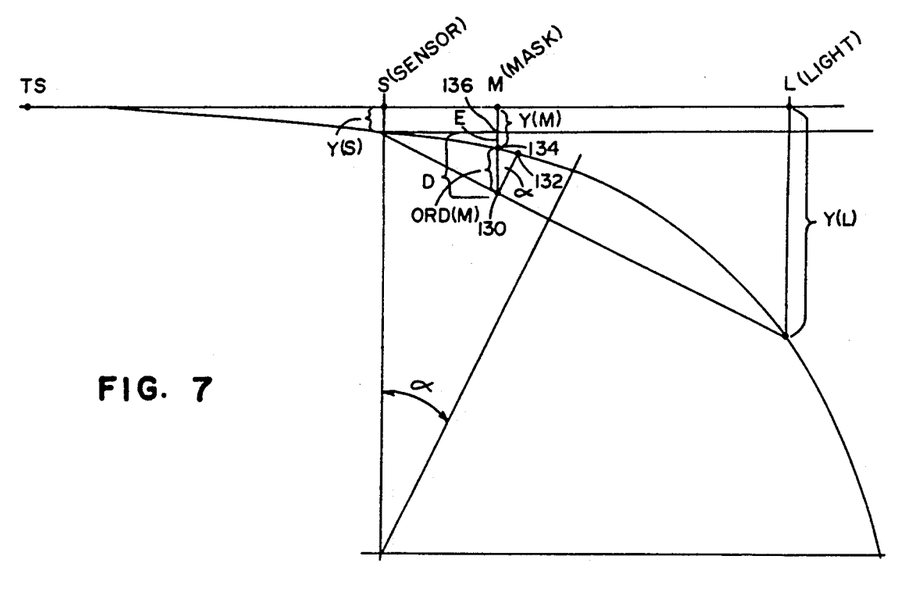
FIG. 7 is a geometric illustration of the desired ordinate calculation.

FIG. 7 illustrates the geometric calculation of the ordinate at point M along the spiral. The distance between points 130 and 132 is the precise ordinate at point M. However, the angle $\alpha$ for spirals is extremely small; and, therefore, the distance between points 130 and 134 is sufficiently close to the actual ordinate so as to be used as the actual ordinate by the present invention. This decision is made in part because the calculation of the distance between points 130 and 134 is more easily performed than the calculation of the distance between points 130 and 132.

Geometrically, the line segment ORD(M) is equal to the line segment between points 130 and 136 minus the line segment between points 134 and 136. Geometrically stated, this relationship is defined as follows when all of points S, M, and L are on the spiral:

$$ORD(M) = \frac{A(Y(L) - Y(S))}{C} - (Y(M) - Y(S))$$

wherein
A = the distance between points S and M
C = the distance between points S and L
Which can be simplified as follows:

$$ORD(M) = \frac{A}{C} Y(L) + \frac{C-A}{C} Y(S) - Y(M)$$

Using the Y offset formula for spirals, this equation becomes:

$$ORD(M) = \frac{k}{600}\left[\frac{A}{C}(x + (C-A))^3 + \frac{C-A}{C}(x-A)^3 + X^3\right]$$

Which can be reduced to:

$$ORD(M) = \frac{k}{600}[3x(CA - A^2) + AC^2 - 2A^2C + 2A^3 - A^2C]$$

Knowing that the offset is zero at the TS transition point, the location along the track of the transition point can be approximated by solving the above equation equal to zero. When done, it is found that:

$$X = \frac{2A - C}{3}$$

Which can also be written as:

$$X = \frac{A - B}{3}$$

wherein B = the distance between points M and L The values of A and B are therefore the lengths of the two chord segments from the point of ordinate measurement to the rail.

When S corresponds to the sensor position, M to the mask position, and L to the light position, it is seen that the graph intersection point is located a distance from the transition point approximately equal to the mask-to-sensor distance minus the mask-to-light distance divided by three. Applicants believe that they are the first to recognize that the transition point is not located at the graph intersect point. The difference created by this measurement was not noticed when the measurements were taken by hand at locations spaced relatively far apart.

Returning to FIG. 2, the graph offset distance GO is illustrated as the distance between points 100 and 118. Again, point 118 is the intersection of line segments 104 and 108, and the transition point 100 is offset therefrom by the above found distance. Similarly, the SC transition point 102 is found by adding the graph offset GO to the point 120 forming the intersection of the line segments 106 and 108. These located transition points can then be used in conventional fashion to reconstruct the desired ordinate values between points 105 and 110 and points 107 and 112 which form a curved line and not a straight line segment.

Figure 8:
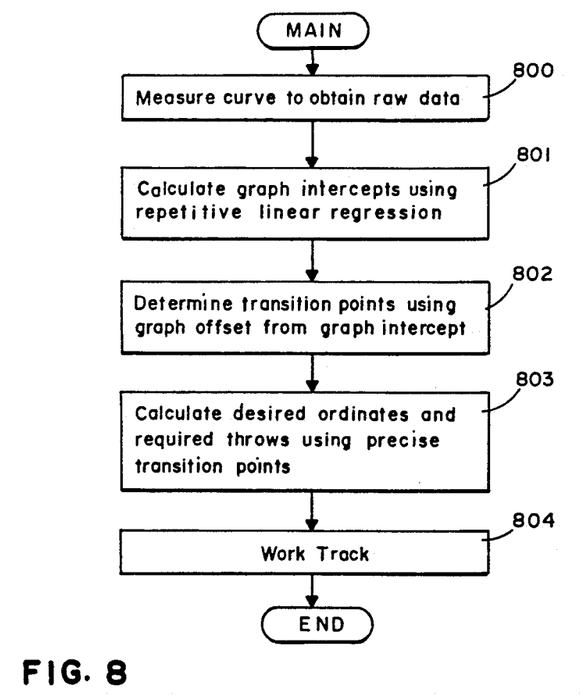
FIG. 8 is a flow diagram showing the overall program flow of the curve liner.

The overall program flow for the curve liner is illustrated in FIG. 8. The program flow is generally divided into five parts. In block 801, the computer calculates the graph intercept points by calculating multiple linear regressions for each spiral section and selecting the linear regression with the best correlation coefficient. This series of linear regressions is performed to avoid tainting of the line 108 by the data in the curved line segments 114 and 116 (see FIG. 2). In the second block 802, the transition points are found using the graph offset technique from the graph intercepts. In block 803, the desired ordinates are calculated based upon the tangent and curve information and the location of the transition points. Finally in block 804, the track is worked pursuant to the desired ordinate data to realign the track to the best-fit mathematical model.

Figure 9A:
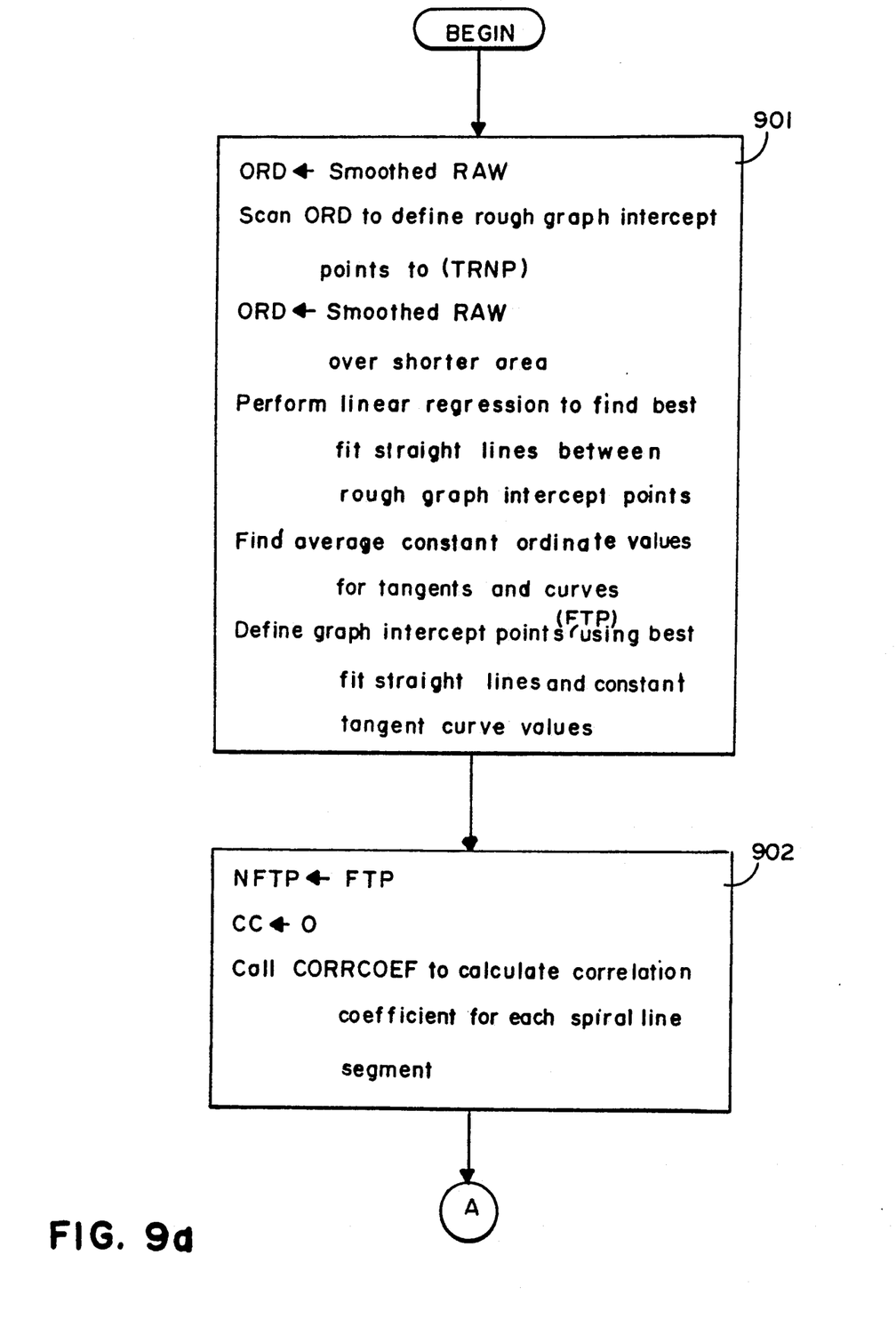
FIGS. 9a, 9b, 9c, and 9d illustrate the program flow of the linear regression and graph intercept calculations.
Figure 9B:
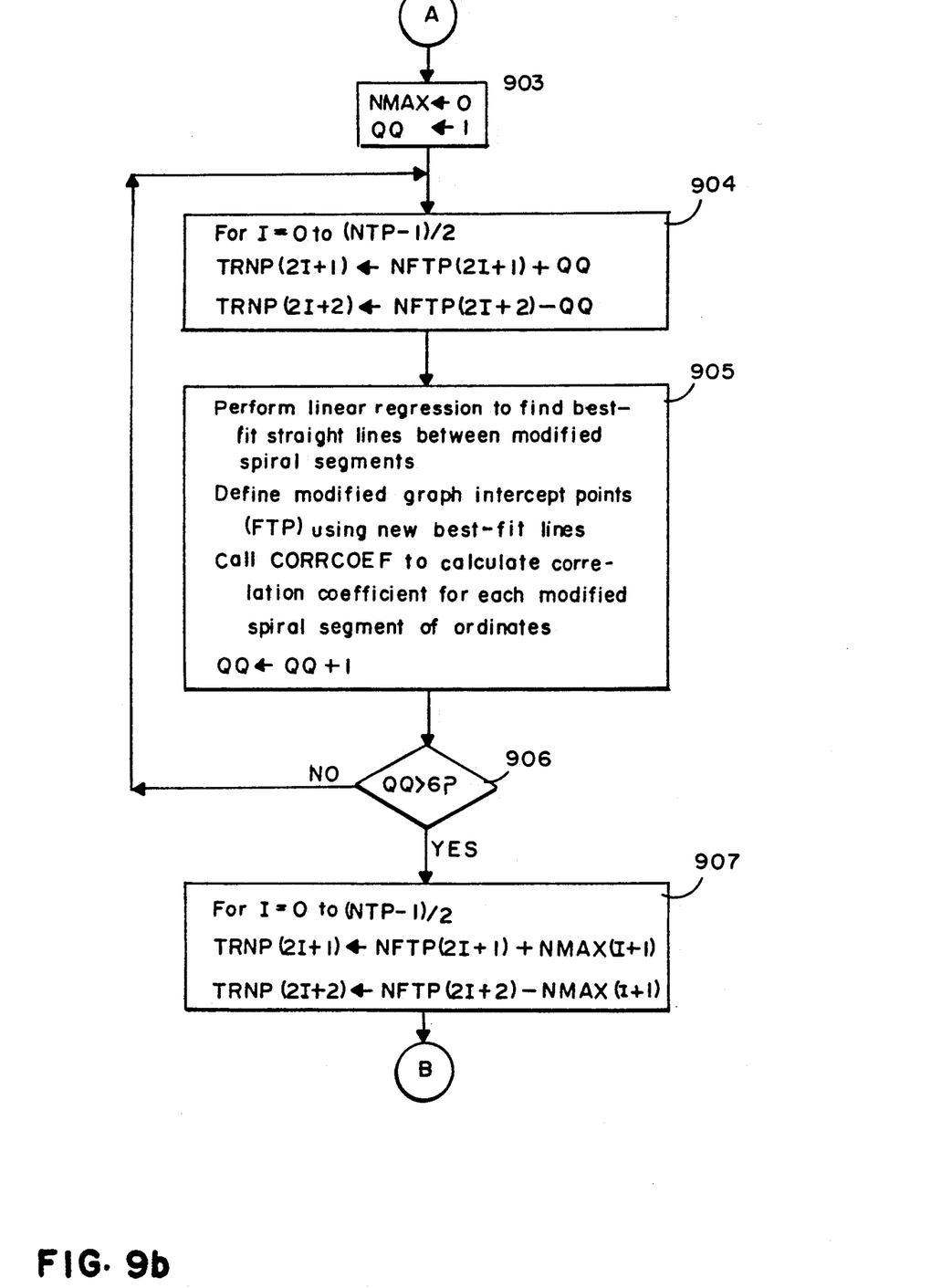
Figure 9C:
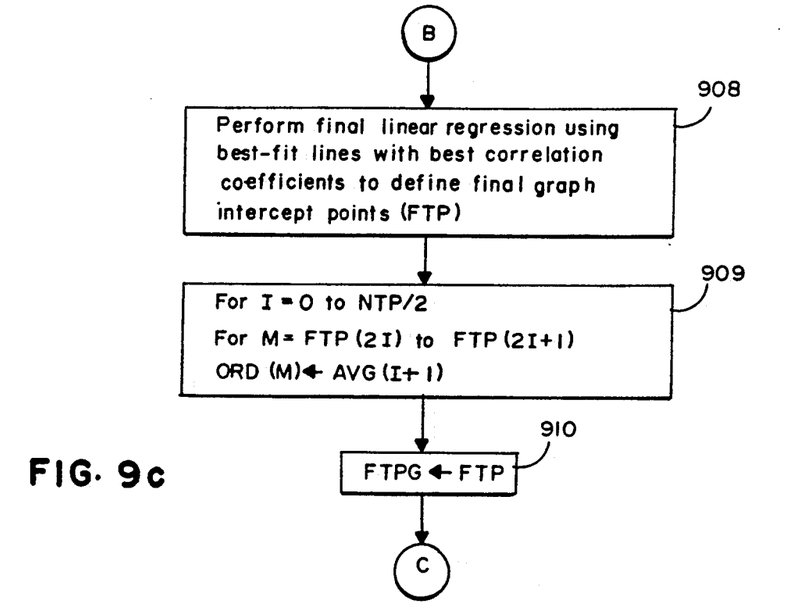

FIGS. 9a, 9b, and 9c show the general program flow for the location of the graph intercept points. The processing of FIG. 9 is initiated after the apparatus 40 has made its first pass over the track to collect the ordinate information. Upon initiating of the processing, all functions in block 901 are performed in a manner generally identical to that described in the Canadian patent. The ordinate information acquired from the track measurement is in an array RAW. The RAW data is smoothed and placed in the array ORD for initial scanning for graph intercept points. The ORD array is scanned to define rough graph intercept points (TRNP) which are those locations where the ordinates are not constant indicating that the track is in a spiral area. After the initial intercept points are found, the RAW data is smoothed over a shorter area and stored again in ORD. A single linear regression is then performed between each pair of rough graph intercept points defining a spiral track area to produce best-fit straight lines. Additionally, average constant ordinate values are calculated in areas of tangents and curves. Finally, the graph intercept points (FTP) are redefined using the calculated best-fit straight lines through the spirals and the constant tangent and curve values. The processing thus far parallels that described in the Canadian patent.

Block 902 begins the departure from the Canadian patent. The graph intercept points are stored in NFTP, and the correlation coefficient array CC is initialized to zero. The CORRCOEF subroutine is then called to calculate a correlation coefficient for each line segment in a spiral area. Consequently, the array CC includes a correlation coefficient for each of the initially determined spiral line segments.

Control then passes via off-page connector A to FIG. 9b and specifically block 903. The NMAX array is initialized to zero and the variable QQ is set to one.

Control then passes to block 904 which defines an iterative loop. By performing the loop from I=0 to I=(NTP−1)/2, all spiral segments are processed. As each spiral line segment is processed, the number QQ of ordinate values is deleted from the beginning and end of the initial spiral line data for recalculation of the linear regression. Consequently, on the first pass through the loop beginning with block 904, a linear regression is calculated for the spiral line segment shorter by one ordinate value at both the beginning and end of the segment. On the second pass through the loop, the segment is shortened by two ordinate values at the beginning and the end.

In block 905, the linear regression is performed on the shorter segment of ordinate values to find the best-fit straight line through the modified spiral segment. Temporary modified graph intercept points are then calculated using the linear regression; and the CORRCOEF subroutine is called to calculate the correlation coefficient for the modified best-fit line. As will be understood in conjunction with the description of CORRCOEF below, the correlation coefficient associated with that line segment is updated if it is better than any previously calculated correlation coefficient. Consequently, the line segment with the best correlation coefficient is selected. Finally, QQ is incremented; and, until it exceeds the value six as determined in block 906, the loop of blocks 904 and 905 is repeated. Consequently, a linear regression and a corresponding correlation coefficient are calculated for each of the spiral segments for the full distance between (1) the initial graph intercept points, (2) each new spiral graph intercept points when the initial segment is shortened by one point at either end, (3) by two points at either end, (4) by three points at either end, (5) by four points at either end, (6) by five points at either end, and (7) by six points at either end. The number of times that the loop must be performed is empirically determined to find the best-fit straight line through the spiral area while minimizing the impact of the curved areas 114 and 115 (see FIG. 2).

Program flow then passes to block 907 which initiates an iterative loop to perform a final linear regression for the best-fit line associated with each spiral. NMAX is an array which indicates the linear regression having the highest correlation coefficient associated with each spiral. For some spirals, it may be the regression deleting two ordinates at either end; for some spirals it may be the regression deleting five ordinates at either end; and so forth. Block 907 places a value in TRNP equal to the previously calculated intersect point modified by the number of points (NMAX) corresponding to the best correlation coefficient. Control passes to block 908 wherein the final linear regression is performed using the best-fit lines to define final graph intercept points (FTP) which correspond to the points 118 and 120 in FIG. 2.

Control then passes to block 909 wherein the average ordinate value is calculated for each tangent series of ordinates and each curve series of ordinates between the newly defined final graph intercept points. Finally, the final transition points are archived in block 910 in the array FTPG.

Figure 9D:
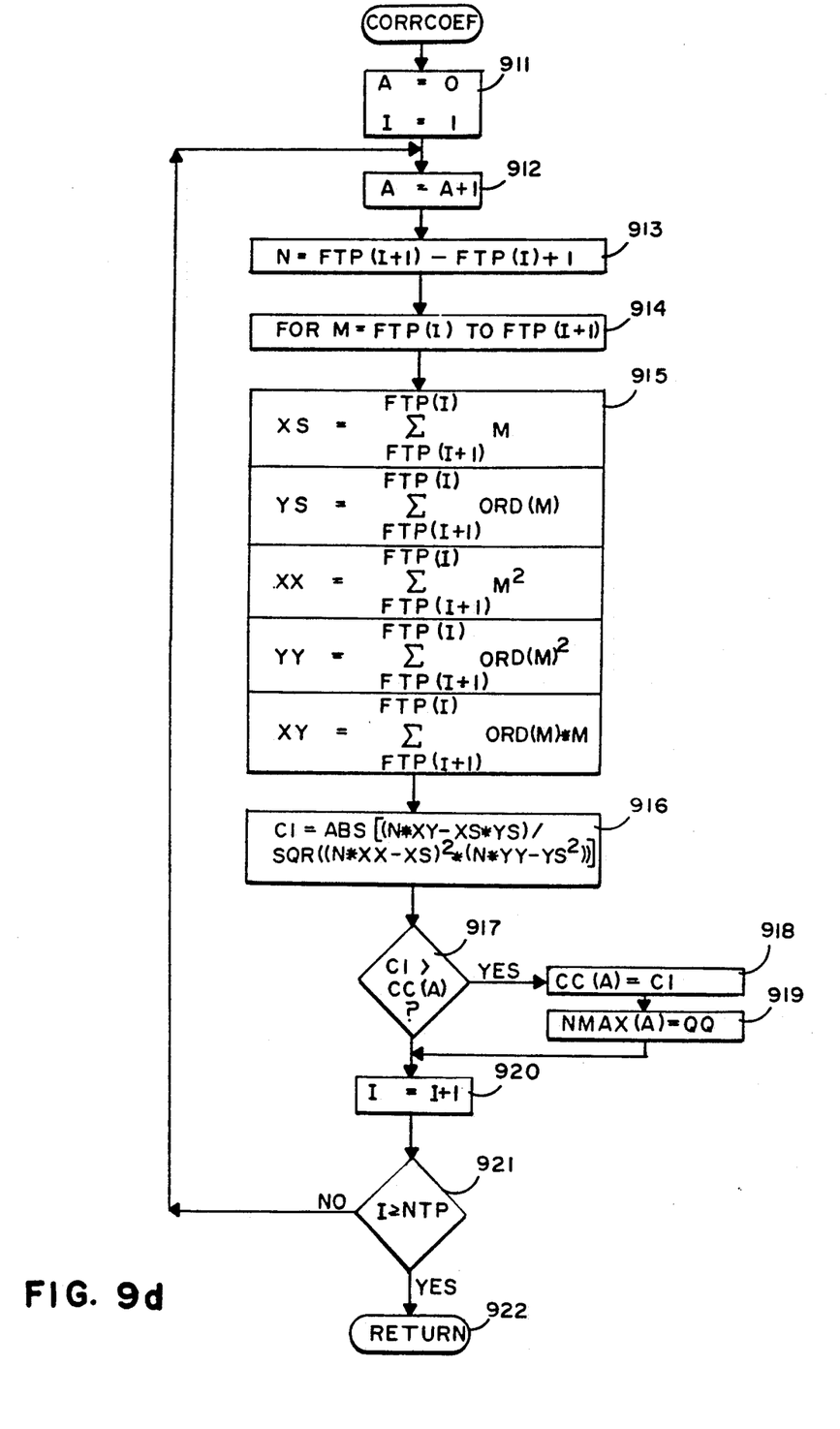

The CORRCOEF subroutine illustrated in FIG. 9d calculates a linear regression, calculates a corresponding correlation coefficient, and updates the CC and NMAX arrays if the new correlation coefficient is better than any previously existing correlation coefficient for the particular spiral. Upon entry, the variables A and I are initialized 911. Blocks 912, 913, 914, and 915 are a conventional means of performing a linear regression on the ordinate points of the defined line segment. A correlation coefficient C1 is calculated 916 according to well-known formulas. If the newly calculated correlation coefficient C1 is larger (i.e. closer to 1) than any previous correlation coefficient for the spiral as stored in the CC array, the CC array is updated 918 to reflect the higher correlation coefficient; and the NMAX array is updated 919 to reflect the number of ordinate values removed from either end of the spiral line segment for that regression. I is then incremented 920 to initiate processing on the next spiral and so long as I is not greater than the number of transition points (NTP) as determined in block 921 program flow returns to block 912. After all spiral segments have been processed, the subroutine returns 922 to the calling location of FIGS. 9a or 9b.

Figure 10:
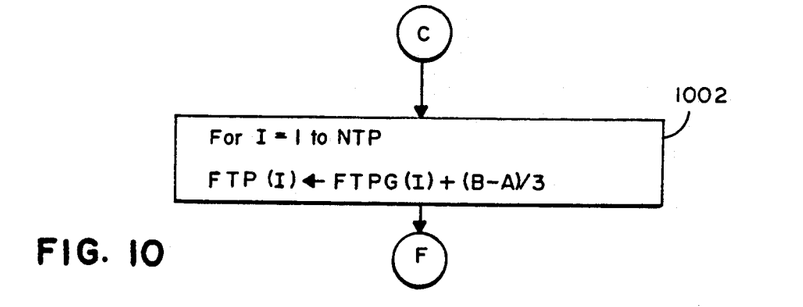
FIG. 10 illustrates the program flow of the transition point calculation.

The processing for determining the precise track location of the transition points is illustrated in FIG. 10. Program flow passes to block 1002 wherein each transition point FTP is calculated as the graph intercept point FTPG plus the graph offset, which as previously calculated is equal to $(B-A)/3$. Consequently, the track transition points are mutually distinct from the graph intercept points. After block 1002, the track locations of the transition points such as 100 and 102 (see FIG. 2) are stored in FTP.

Figure 11A:
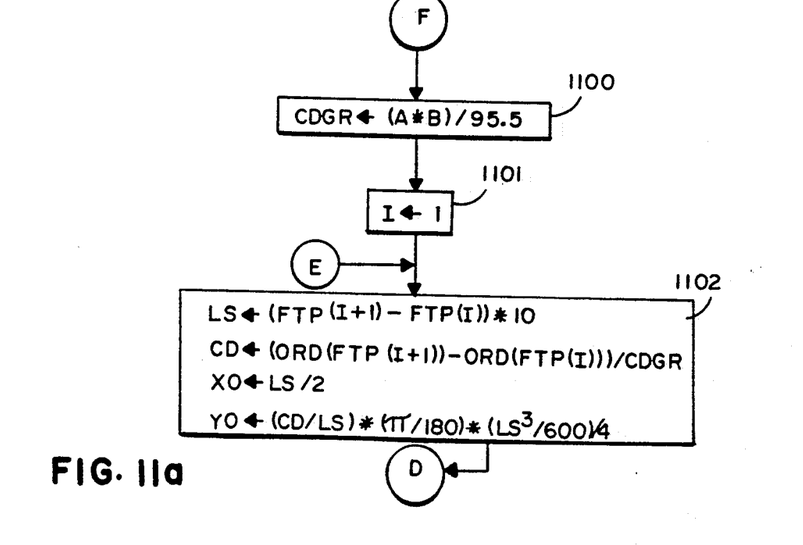
FIGS. 11a, 11b, and 11c illustrate the program flow for the calculation of the desired ordinates.
Figure 11B:
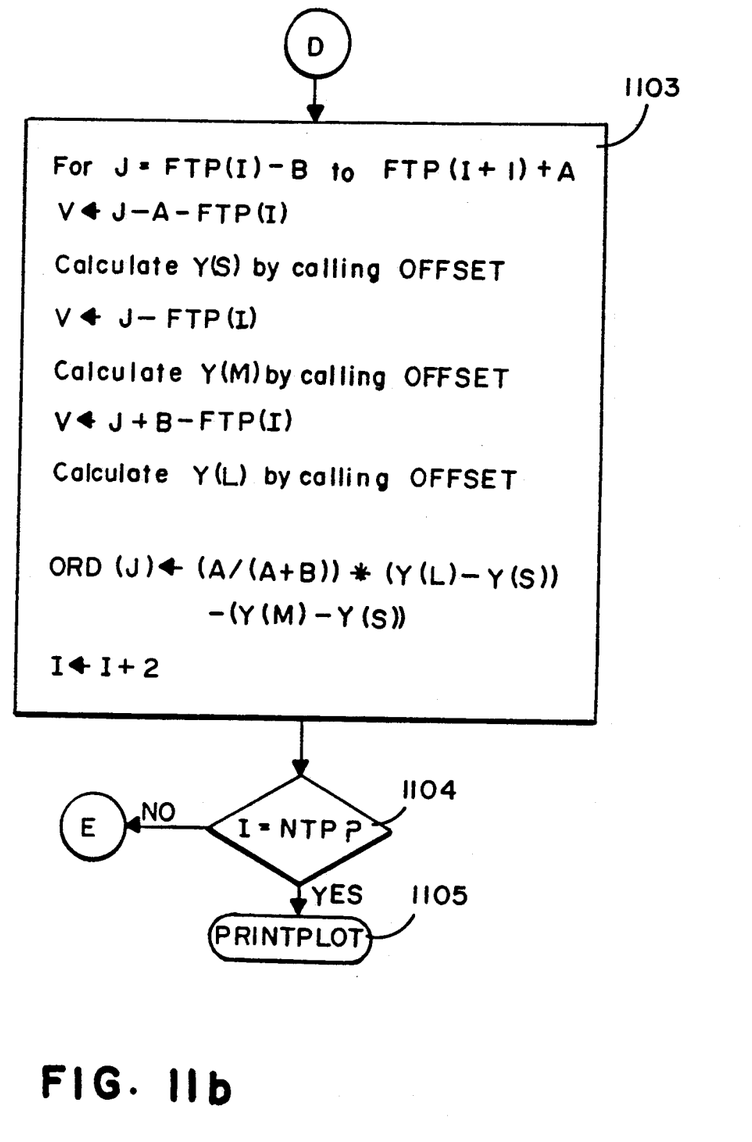
Figure 11C:
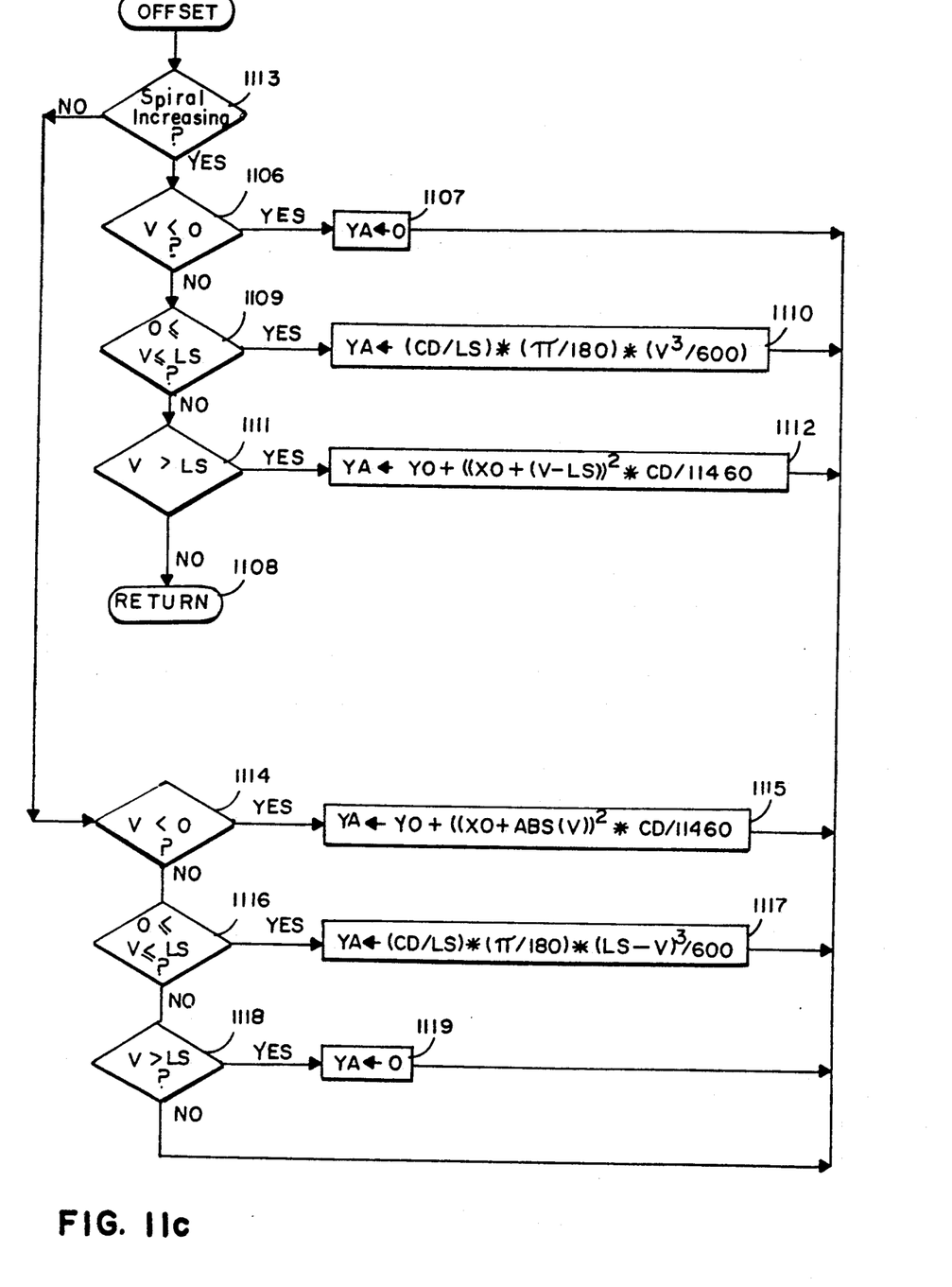

FIGS. 11a, 11b, and 11c illustrate the calculation of the desired ordinates as a function of the located transition points and the constant tangent and curve degrees. In block 1100 the variable CDGR is calculated as $(A*B)/95.5$. This produces a number corresponding to mask movement units in tenth of an inch per curve degree. The mathematics work out so that this is solely a function of the mask-to-sensor distance A and the mask-to-light distance B. The variable I is initialized 1101 to one to indicate the first transition point signalling the beginning of the first spiral. Program flow then passes to block 1102 wherein the variables LS, CD, XO, and YO are calculated which are constant for each spiral based on spiral parameters. LS is the length of the spiral and is equal to the distance between the present transition point and the next transition point times ten (since each station corresponds to ten feet). CD refers to the curve degree and is calculated as the ordinate at the next transition point minus the ordinate at the present transition point divided by the variable CDGR which was calculated in block 1001. XO and YO are calculated according to well-known formulas as illustrated.

Program flow then continues to block 1103 (FIG. 11b) which modifies the ordinate values from the time the light passes the TS transition point 100 until the sensor passes the SC transition point 102 (see FIG. 2). This explains the nature of the "for" statement in block 1103. The ordinate at each point in the defined range can be calculated as a function of the sensor offset, the mask offset, and the light offset. Consequently, the remaining procedure set forth in block 1103 calculates these offsets and ultimately the ordinate. The dummy variable V is set equal to J (the current position) minus A (the mask-to-sensor distance) minus FTP(I) (the initial transition point of the spiral) so that V contains the sensor position relative to the start of the spiral. The sensor offset Y(S) is then calculated by calling the OFFSET subroutine which calculates the Y offset at this point. Similarly, the mask offset Y(M) and the light offset Y(L) are also calculated using a similar strategy. Finally, the ordinate at the present position J is calculated according to the following formula:

$$ORD(J) \leftarrow (A/(A+B))*(Y(L)-Y(S))-(Y(M)-Y(S))$$

I is then increased by two to proceed to the next transition point beginning a spiral.

A decision 1104 is made to determine whether all transition points have been processed. If not, program flow returns to block 1102 for the calculation of constants particular to the next spiral. If so, the plot is printed 1105 to produce results of the type illustrated in FIGS. 5 and 6.

FIG. 11c illustrates the OFFSET subroutine wherein the Y offset within a spiral is calculated as a function of the distance X from the beginning of the spiral. The spiral is checked 1113 to determine whether it is increasing (i.e. heading into a curve) or decreasing (i.e. heading out of the curve). If the spiral is increasing, control flow passes to block 1106; and if the spiral is decreasing, to block 1114.

When the spiral is increasing, the dummy variable V presenting the track location to the OFFSET subroutine is checked 1106 to determine whether it is less than zero. If so, the position is before the initial transition point and therefore assumed to be on tangent track. Accordingly, Y is set 1107 to zero, and program flow returns 1108. If the position is not pre-transition point, a decision 1109 is made to determine whether it is on the spiral. If so, the Y offset (YA) is set 1110 according to the well-known spiral formula illustrated in block 1110, and program flow returns 1108. Finally, if the present position V is greater than LS as determined in block 1111, the present position is on a constant curve portion. Accordingly, the Y offset YA is established according to the well-known formula illustrated in block 1112, and program flow returns 1108 to the calling subroutine.

When the spiral is decreasing, the dummy variable V presenting the track location to the offset subroutine is checked 1114 to determine whether it is less than zero. If so, the present position is before the initial transition point and therefore on a constant curve portion. The Y offset (YA) is established according to the well known formula illustrated in block 1115; and program flow returns 1108 to the calling subroutine. If the position is not pre-transition point, a decision 1116 is made to determine whether it is on the spiral. If so, the Y offset (YA) is set according to the well known spiral formula illustrated in block 1117, and program flow returns 1108 to the calling subroutine. Finally, if the present position V is greater than LS as determined in block 1118, the present position is beyond the final transition point and therefore on tangent track. Accordingly, YA is set 1119 to zero; and program flow returns 1108 to the calling subroutine. All formulas presented in FIG. 11c are generally well known to those having ordinary skill in the art.

The above description illustrates the improved track-fitting permitted by Applicants' recognition of ordinate graph geometry. First, a plurality of linear regressions are calculated for varying line segments in each spiral area to reduce the impact of the curved graph portions at either end of the uniform spiral slope. The linear regression having the greatest correlation coefficient is selected and graph intercept points are determined. The location of the track transition points are then determined by adding the absolute value of the graph offset to the graph intercept points. Finally, the ordinate values in the curved portion of the ordinate graph (i.e. the transition portions from tangent or curved segments to spiral segments) are calculated. Consequently, a mathematical best-fit curve is calculated with improved precision over previous methods whether performed by hand or with the aid of a computer. The requirement for human intervention in the process is eliminated; and tracks can be lined more rapidly and more accurately than has previously been possible.

The above description is that of a preferred embodiment of the invention. Various changes and alternations can be made without departing from the spirit and broader aspects of the invention as set forth in the appended claims which are to be interpreted in accordance with the principles of patent law including the doctrine of equivalents.

The embodiments of the invention in which an exclusive property or privilege is claimed are defined as follows:

1. An apparatus for lining a railroad track comprising:
    a vehicle assembly for traveling along a railroad track;
    shifting means for laterally shifting the railroad track;
    measuring means carried by said vehicle assembly for measuring initial track ordinates as said vehicle assembly travels along said track;
    computer means for calculating an ideal track shape as a function of said initial track ordinates, said computer means including:
        memory means for receiving and storing the initial track ordinates;
        means for detecting sequences of relatively constant ordinate values indicative of tangent and curve track segments;
        means for performing a plurality of linear regressions on varying sequences of ordinate values for each spiral track segment between segments of relatively constant ordinate values;
        selecting means for selecting one of the linear regressions associated with each spiral as the best fit linear regression;
        means for finding the points of intersection between each best-fit linear regression and the relatively constant value at either end thereof;
        means for locating the track transition points as a function of the points of intersection, the transition points being distinct from said intersection points; and
        means for calculating the desired track ordinates as a function of the tangent and curve information and the transition points; and
    control means for causing said shifting means to move the track responsive to said desired ordinate values as said vehicle assembly travels along the track.

2. An apparatus as defined in claim 1 wherein said selecting means includes means for calculating a correlation coefficient associated with each linear regression.

3. An apparatus as defined in claim 1 wherein the varying sequences on which linear regressions are performed are created by repetitively removing one ordinate value from each end of the spiral track segment.

4. An apparatus as defined in claim 1 wherein said transition point locating means includes means for adding the absolute value of $(A-B)/3$ to each point of intersection to locate the associated transition point wherein A and B are the length of the chord segments from the point of ordinate measurement to the track.

5. An apparatus for lining a railroad track comprising:
    a vehicle assembly for traversing a railroad track;
    measurement means carried by said vehicle assembly for measuring the track ordinates as said vehicle assembly traverses the track;
    computer means for calculating ideal track ordinates for an ideal track configuration, said computer means including:
        means for detecting constant series of constant ordinate values indicative of tangent or curve track;
        linear regression means for performing linear regressions on different segments of each ordinate series of varying ordinate values;
        means for selecting the linear regression for each ordinate series having the highest correlation coefficient;
        means for defining track transition points based on the constant ordinate values for the constant series and the selected linear regressions for the spiral series; and
        means for calculating the ideal track ordinates as a function of the constant ordinate values and the transition points; and
    lining means for horizontally moving said track in response to the ideal track ordinates.

6. An apparatus as defined in claim 5 wherein said linear regression means includes means for creating the different segments by repeatedly removing one ordinate value from either end of the ordinate series.

7. An apparatus as defined in claim 5 wherein said transition point defining means includes:
    means for determining the graph intercept points where the selected linear regressions intersect the constant series on either side thereof; and
    means for adding a constant value to the track location of each graph intersection point to locate the transition point.

8. An apparatus for lining a railroad track comprising:
    a vehicle assembly for moving on a railroad track;
    shifting means carried by said vehicle assembly for laterally moving the track;
    measurement means carried by said vehicle assembly for measuring track ordinates at a plurality of spaced locations along the length of the railroad track;
    computer memory means for storing the track ordinates;
    computer processor means for calculating better ordinates for a better track configuration than the existing track configuration as a function of the stored track ordinates, said processor means including:
        means for detecting areas of generally constant ordinate values indicative of tangent and curve track portions;
        means for fitting sloped lines to the ordinate data between areas of constant ordinate values;
        means for determining the intersections of the sloped lines with the average ordinate values;
        means for locating track transition points as a function of said intersections, the transition points being mutually distinct from said intersections;
        means for determining the better ordinates as a function of the constant ordinate values and the transition points; and
        means for calculating desired track throws as the difference between the actual track ordinate and the better track ordinate; and
    control means for causing the shifting means to laterally move the track the desired track throw distance to line the track.

9. An apparatus as defined in claim 8 wherein said transition point locating means includes means for adding the absolute value of $(A-B)/3$ to the track position of each intersection to locate the track position of the transition point, wherein A and B are the lengths of the chord segments from the ordinate measurement point to the rail.

10. An apparatus as defined in claim 8 wherein said sloped line fitting means includes:

means for fitting a plurality of lines to varying segments of each area of ordinate data between areas of constant ordinote values; and means for selecting for each area one of the fitted lines as the sloped line.

11. A method for lining a railroad track comprising:

measuring initial track ordinates along a length of railroad track;

calculating an ideal track shape as a function of the initial track ordinates, said calculation being performed using a computer and including the steps of:

receiving and storing the initial track ordinates;

detecting sequences of relatively constant ordinate values indicative of tangent and curve track segments;

performing a plurality of linear regressions on varying sequences of ordinate values for each spiral track segment between segments of relatively constant ordinate values;

selecting one of the linear regressions associated with each spiral as the best-fit linear regression;

finding the points of intersection between each best-fit linear regression and the relatively constant value at either end thereof;

locating the track transition points as a function of the points of intersection; and calculating the desired track ordinates as a function of the tangent and curve information and the transition points; and shifting the track laterally to the desired ordinate values to line the track.

12. A method as defined in claim 11 wherein said selecting step includes calculating a correlation coefficient associated with each linear regression.

13. A method as defined in claim 11 wherein the varying sequences on which linear regressions are performed are created by repetitively removing one ordinate value from each end of the spiral track segment.

14. A method as defined in claim 11 wherein said transition point locating step includes adding the absolute value of (A−B)/3 to each point of intersection to locate the associated transition point, wherein A and B are the length of the chord segments from the point of ordinate measurement to the track.

15. A method for lining a railroad track comprising:

measuring the track ordinates along the length of track to be lined;

calculating ideal track ordinates for an ideal track configuration, said calculating step including:

detecting constant series of constant ordinate values indicative of tangent or constant curve track;

performing linear regressions on different segments of each ordinate series of varying ordinate values;

selecting the linear regression for each ordinate series having the highest correlation coefficient;

defining track transition points based on the constant ordinate values for the constant series and the selected linear regressions for the spiral series; and calculating the ideal track ordinates as a function of the constant ordinate values and the transition points; and moving the track in response to the ideal track ordinates to line the track.

16. A method as defined in claim 15 wherein said linear regression performing step includes creating the different segments by repeatedly removing one ordinate value from either end of the ordinate series.

17. A method as defined in claim 15 wherein said transition point defining step includes:

determining the graph intercept points where the selected linear regressions intersect the constant series on either side thereof; and adding a constant value to the track location of each graph intercept point to locate the transition point.

18. A method for lining a railroad track comprising:

moving along a railroad track;

measuring track ordinates at a plurality of spaced locations along the length of the railroad track;

storing the track ordinates;

calculating better ordinates for a better track configuration than the existing track configuration as a function of the stored track ordinates, said calculating step including:

detecting areas of generally constant ordinate values indicative of tangent and curve track portions;

fitting sloped lines to the ordinate data between areas of constant ordinate values;

determining the intersections of the sloped lines with the average ordinate values;

locating track transition points as a function of said intersections, the transition points being mutually distinct from said intersections;

determining the better ordinates as a function of the constant ordinate values and the transition points; and calculating desired track throws as the difference between the actual track ordinate and the better track ordinate;

causing a shifting means to laterally move the track the desired track throw distance to line the track.

19. A method as defined in claim 18 wherein said transition point locating step includes adding the absolute value of (A−B)/3 to the track position of each intersection to locate the track position of the transition point, wherein A and B are the lengths of the chord segments from the ordinate measurement point to the rail.

20. A method as defined in claim 18 wherein said sloped line fitting step includes:

fitting a plurality of lines to varying segments of each area of ordinate data between areas of constant ordinate values; and selecting for each area one of the fitted lines as the sloped line.

* * * * *

UNITED STATES PATENT AND TRADEMARK OFFICE
CERTIFICATE OF CORRECTION

PATENT NO. : 5,012,413
DATED : April 30, 1991
INVENTOR(S) : Sroka et al.

It is certified that error appears in the above-identified patent and that said Letters Patent is hereby corrected as shown below:

In the Abstract, Line 12:
   "tract" should be --track--

Column 13, Claim 10, Line 4:
   "ordinote" should be --ordinate--

Signed and Sealed this

Twenty-sixth Day of January, 1993

Attest:

STEPHEN G. KUNIN

*Attesting Officer*     Acting Commissioner of Patents and Trademarks